United States Patent
Schuler

(10) Patent No.: US 10,796,515 B2
(45) Date of Patent: Oct. 6, 2020

(54) VEHICLE CONTROL SYSTEM

(71) Applicant: VALEO INTERIOR CONTROLS (SHENZHEN) CO., LTD, Shenzhen (CN)

(72) Inventor: Stephane Schuler, Shenzhen (CN)

(73) Assignee: VALEO INTERIOR CONTROLS (SHENZHEN) CO., LTD, Shenzhen (CN)

( * ) Notice: Subject to any disclaimer, the term of this patent is extended or adjusted under 35 U.S.C. 154(b) by 343 days.

(21) Appl. No.: 15/869,200

(22) Filed: Jan. 12, 2018

(65) Prior Publication Data

US 2018/0204401 A1   Jul. 19, 2018

(30) Foreign Application Priority Data

Jan. 13, 2017   (CN) .......................... 2017 1 0029835

(51) Int. Cl.

| | |
|---|---|
| *G07C 9/00* | (2020.01) |
| *B60R 25/01* | (2013.01) |
| *G07C 9/29* | (2020.01) |
| *B60R 25/24* | (2013.01) |
| *B60R 25/20* | (2013.01) |
| *B60C 23/04* | (2006.01) |
| *G08C 17/02* | (2006.01) |
| *H04Q 9/00* | (2006.01) |
| *H04L 29/08* | (2006.01) |
| *B60R 16/023* | (2006.01) |
| *E05F 15/00* | (2015.01) |

(52) U.S. Cl.
CPC ............ *G07C 9/29* (2020.01); *B60C 23/0418* (2013.01); *B60C 23/0435* (2013.01); *B60C 23/0438* (2013.01); *B60R 25/209* (2013.01); *B60R 25/24* (2013.01); *G07C 9/00174* (2013.01); *G08C 17/02* (2013.01); *H04Q 9/00* (2013.01); *B60R 16/023* (2013.01); *E05F 15/00* (2013.01); *E05Y 2900/106* (2013.01); *G07C 2009/00507* (2013.01); *G07C 2009/00769* (2013.01); *G07C 2009/00928* (2013.01); *G07C 2209/62* (2013.01); *G08C 2201/92* (2013.01); *H04L 67/12* (2013.01)

(58) Field of Classification Search
CPC .......... G07C 9/00; B60R 25/01; B60R 25/24; B60W 30/06; G08C 17/02
USPC .......................................................... 701/2
See application file for complete search history.

(56) References Cited

U.S. PATENT DOCUMENTS

| | | | |
|---|---|---|---|
| 6,909,956 B2 * | 6/2005 | Weed ...................... | B60R 25/00 180/197 |
| 2012/0229298 A1 * | 9/2012 | Ree ......................... | G05B 15/02 340/870.02 |

(Continued)

*Primary Examiner* — Tan Q Nguyen
(74) *Attorney, Agent, or Firm* — Osha Liang LLP

(57) ABSTRACT

The present disclosure provides a vehicle control system. The vehicle control system includes a transceiver operating in a sub-GHz frequency band configured to transmit and receive data from a RKE user terminal of the vehicle, a set of TPMS sensors and at least one remote control terminal located outside the vehicle; and an ECU connected to the transceiver and configured to: perform lock or unlock and engine start functions in responding to data from the RKE user terminal, receive tire pressure data from the TPMS sensors and control the remote control terminal in responding to a user action.

13 Claims, 3 Drawing Sheets

(56) References Cited

U.S. PATENT DOCUMENTS

| | | | |
|---|---|---|---|
| 2013/0120159 A1* | 5/2013 | Stahlin | G08G 1/00 |
| | | | 340/902 |
| 2016/0129736 A1* | 5/2016 | Peine | B60C 23/0416 |
| | | | 701/32.3 |
| 2017/0149623 A1* | 5/2017 | Hall | G05B 15/02 |
| 2017/0344042 A9* | 11/2017 | Davis | H04W 4/80 |

* cited by examiner

VEHICLE CONTROL SYSTEM

FIELD OF THE PRESENT INVENTION

The present disclosure generally relates to the field of vehicle control, and particularly to a vehicle control system that integrates a Sub-GHz transceiver for the functions of Remote Keyless Entry (RKE) or Passive Entry and Passive Start System (PEPS), a direct Tire Pressure Monitoring System (TPMS) and a function to remotely control vehicle external appliances such like a Universal Garage Door Opener (UGDO).

BACKGROUND OF THE PRESENT INVENTION

Currently, almost all vehicles are equipped with a RKE system which includes a RKE user terminal carried by the user and a RKE electronic control unit (ECU) installed within the vehicle. The RKE ECU is equipped or connected to a radio frequency (RF) receiver to receive signals from the RKE user terminal and control vehicle operations, such as locking, unlocking the door of the vehicle or starting the engine. In some cases, either for improved security authentication purposes or to display vehicle data on a handheld terminal display, the RKE function requires a bi-directional communication between the handheld device and the vehicle, thus resulting in a radio frequency transceiver upscale.

In addition, following increased safety standard requirements, an increasing number of vehicles are equipped with a direct Tire Pressure Monitoring System (TPMS) which includes a TPMS ECU and a set of TPMS sensors. Each of the TPMS sensors is typically located within a tire, assembled together with the valve, to sense various physical parameters within the tire, primarily its air pressure and temperature. The TPMS sensor is fitted with a transmitter that communicates the sensed data to the TPMS ECU. For some TPMS system, the communication between the sensors and the ECU might be bi-directional, allowing the TPMS sensors to receive commands from its ECU.

In many regions around the world, it is also popular to have its garage door opening system motorized and remotely controllable. FIG. 1 illustrates a schematic diagram of the garage door opening system in the prior art. As shown in FIG. 1, the garage door opening system usually includes a garage door receiver 40 and a handheld remote terminal 41. The garage door receiver 40 is usually located near the garage door and the handheld remote terminal 41 is carried by the user. When prompted by the user, the handheld remote terminal 41 transmits a command to the garage door receiver 40 to control the garage door wirelessly. The garage door opening system further includes a garage door opener 42 located within the vehicle, which is programmable to learn the characteristics of the garage door signal which the garage door receiver 40 expects to receive for controlling the garage door. The garage door opener 42 features a learning mode which may be entered by using a dedicated Human Machine Interface (HMI) (a long press of the button 44 on the panel 43 that is electrically connected to the garage door opener 42). In learning mode, the garage door opener 42 scans the garage door signal from the handheld remote terminal 41 to learn its characteristics and credentials. Subsequently, when prompted by the user, the garage door opener 42 wirelessly transmits a signal having the characteristics and credentials of the handheld remote terminal 41 to the garage door receiver 40 that controls the garage door. When trained, it is no longer needed to carry along the handheld remote terminal 41 or leave it in the vehicle (theft prevention).

SUMMARY OF THE PRESENT INVENTION

It can be seen from above that, for the above three different functions, different hardware devices are usually installed in the vehicle, i.e., the RKE ECU, the TPMS ECU and the garage door opener 42, which disadvantageously increases the cost. The transceiver that is used for all three functions s redundantly fitted in the vehicle for the purpose of a single function.

In view of this, the present disclosure aims to provide a solution that integrates the three functions using a single common transceiver. In particular, the present disclosure provides a vehicle control system which uses only one hardware device to achieve all the functions of RKE, TPMS and remote control of appliances, which decreases cost of the hardware and saves required spaces in the vehicle.

According to one aspect of the present disclosure, a vehicle control system is provided. The vehicle control system includes a transceiver operating in a sub-GHz frequency band configured to transmit and receive data from a RKE user terminal of the vehicle, a set of TPMS sensors of the vehicle and at least one remote control terminal outside the vehicle; and an ECU connected with the transceiver and configured to: perform lock or unlock and eventually engine start functions in response to data from the RKE user terminal, receive tire pressure data from the TPMS sensors and control the remote control terminal in response to a user action.

In one implementation, the ECU is embedded in a Passive Entry Passive Start (PEPS) ECU.

In one implementation, the transceiver operates in a single frequency band.

In one implementation, the transceiver operates in multiple frequency bands.

In one implementation, the ECU is configured to authenticate the RKE user terminal so as to lock, unlock or start an engine of the vehicle in response to data from the RKE user terminal when the vehicle is in a parked state.

In one implementation, the ECU is configured to receive and assess a tire pressure situation by using the tire data received from the TPMS sensors or to simply receive and broadcast the tire data from the TPMS sensors when the vehicle engine is running.

In one implementation, the ECU is further configured to send commands to the TPMS sensors.

In one implementation, at least one remote control terminal is used to control at least one vehicle external function (typically, a home appliance).

In one implementation, the ECU includes a Universal Garage Door Opener (UGDO) function.

In one implementation, the ECU is further capable of learning and storing a radio frequency signals transmitted from a handheld remote control terminal.

In one implementation, the ECU is further capable of replicating the stored radio frequency signals when prompted by a Human Machine Interface (HMI) within the vehicle.

In one implementation, signals from the RKE user terminal, the TPMS sensors and the remote control terminal are identified by at least one of: a unique ID; a carrier frequency or frequency range; a modulation type; and a communication protocol.

In one implementation, the ECU includes a memory stored with software codes and a processor connected with the memory and configured to execute the software codes to perform the different functions.

BRIEF DESCRIPTION OF THE DRAWINGS

The present disclosure will be understood better and other objectives, details, features and advantages of the present disclosure will become more evident from the description of specific embodiments of the disclosure given in conjunction with the following figures, wherein.

Throughout the figures, the same or like reference numbers indicate same or like elements.

DETAILED DESCRIPTION OF THE PREFERRED EMBODIMENTS

Preferred embodiments of the present disclosure will now be described in more details in conjunction with accompanying figures. Although preferred embodiments of the present disclosure are shown in the accompanying figures, it should be understood that the present disclosure can be embodied in various ways but not be limited to the embodiments depicted herein. Instead, the embodiments are provided herein to make the disclosure more throughout and complete and convey the scope of the present disclosure to those skilled in this art.

Figure 2:
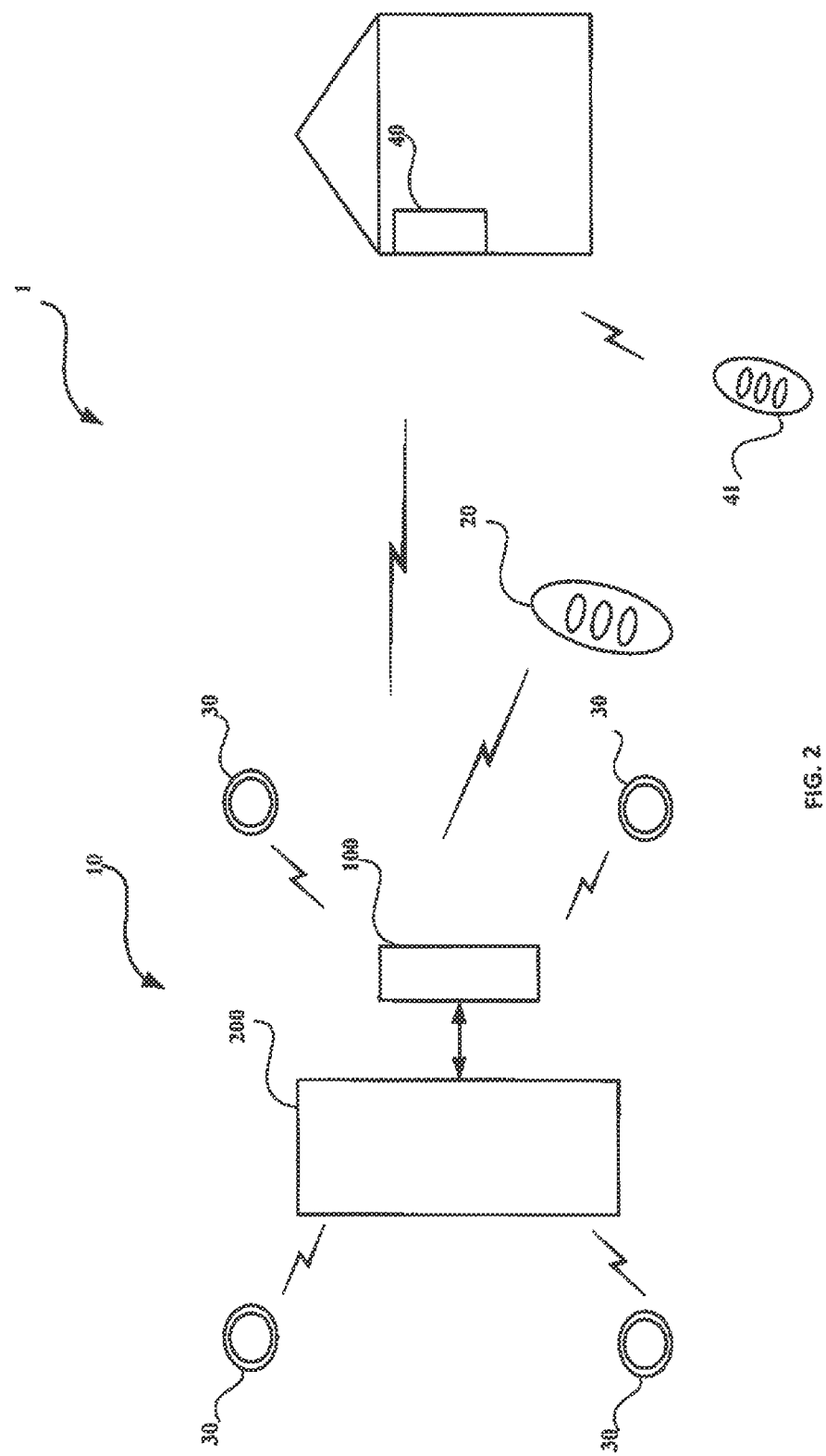
FIG. 2 illustrates a schematic diagram of an environment in which the vehicle control system according to the present disclosure is located.

FIG. 2 illustrates a schematic diagram of an environment 1 in which the vehicle control system 10 according to the present disclosure is located. As shown in FIG. 2, the environment 1 includes a vehicle control system 10 according to the present disclosure, a RKE user terminal 20 carried by the user of the vehicle, a set of TPMS sensors 30 and at least one remote control terminal 40 located outside the vehicle.

The vehicle control system 10 according to the present disclosure includes a transceiver 100 operating in a sub-GHz frequency band and configured to receive data from the RKE user terminal 20, the TPMS sensors 30 and the remote control terminal 40 and, eventually, transmit data to them. Here, the sub-GHz frequency band refers to the frequency band below 1 GHz, especially from 27 MHz to 960 Mhz, which may be applicable to consumer electronics, vehicles, industries and healthcare, etc. such as video/audio device remote controllers, garage door remote controllers, illumination controllers, wireless health monitoring devices and wearable devices, etc. . . .

The vehicle control system 10 further includes an ECU 200 connected with the transceiver 100 and configured to perform locking or unlocking functions of the vehicle in responding to data from the RKE user terminal 20. Further, the ECU 200 is configured to receive tire pressure data from the TPMS sensors 30. Furthermore, the ECU 200 is configured to control the remote control terminal 40 in response to a user action.

In other words, the ECU 200 integrates both the functions of the RKE ECU and the TPMS ECU as described in the background, and further integrates the control function to remotely control the terminal 40. In one implementation, the ECU 200 may be embedded in a PEPS ECU. That is, a PEPS ECU conventionally used for the RKE is extended to further receive the TPMS data and control one or more remote control terminals.

The RKE user terminal 20 may be a smart key carried by the user. When the vehicle is in a parked state, if data is received from the RKE user terminal 20, the ECU 200 will authenticate the RKE user terminal 20. If the authentication is successful, the ECU 200 may initiate locking or unlocking of the vehicle, or starting of the engine of the vehicle.

The TPMS sensors 30 are located within the respective tires of the vehicle. When the vehicle engine is running, the ECU 200 may receive tire pressure data from the TPMS sensors 30 and assess tire pressure situations by using the received tire data. For example, the ECU 200 may compare the received tire pressure data with a predetermined tire pressure threshold. If the received tire pressure data is below the predetermined tire pressure threshold, the ECU 200 may determine that the tires of the vehicle are in an unsafe state and alarm the driver for maintenance or replacement of the tires.

In another example, the ECU 200 only receives and broadcast the tire pressure data from the TPMS sensors 30 without processing it. In this case, another processor in the vehicle will process the obtained tire pressure data.

Usually, each tire of the vehicle will have a TPMS sensor 30 installed therein. Therefore, the number of the TPMS sensors 30 usually depends on the number of tires of the vehicle. For example, for a common vehicle with 4 tires, such as a family car, the number of the TPMS sensors 30 will be 4 or 5 (considering the spare tire). For another example, for a heavy truck with 8 or more tires, the number of the TPMS sensors 30 may be 8 or more.

The number of the TPMS sensors 30 may be more or less than the number of the tires of the vehicle. FIG. 2 illustrates 4 TPMS sensors 30, however, it will be appreciated by those skilled in the art that the present disclosure does not intend to limit the number of the TPMS sensors 30.

In most cases, the communication between the ECU 200 and the TPMS sensors 30 are unidirectional, i.e., the ECU 200 only receives data from the TPMS sensors 30. However, in some other cases, the communication between the ECU 200 and the TPMS sensors 30 are bidirectional. In these cases, the ECU 200 may transmit commands to the TPMS sensors 30.

In one implementation, the at least one remote control terminal 40 may be used to control one or more home appliances, such as garage door openers, security gates, home alarms, lighting and other appliances suitable for remote control.

Hereinafter, the present disclosure is described by taking the remote control terminal 40 as a garage door receiver of the garage door opening system. However, those skilled in the art may appreciate that the remote control terminal 40 of the present disclosure is not limited to the garage door receiver but may include any other appliances suitable for remote control that are not located within the vehicle itself. The garage door opening system may be the Homelink@ system provided by Gentex corporation.

Figure 1:
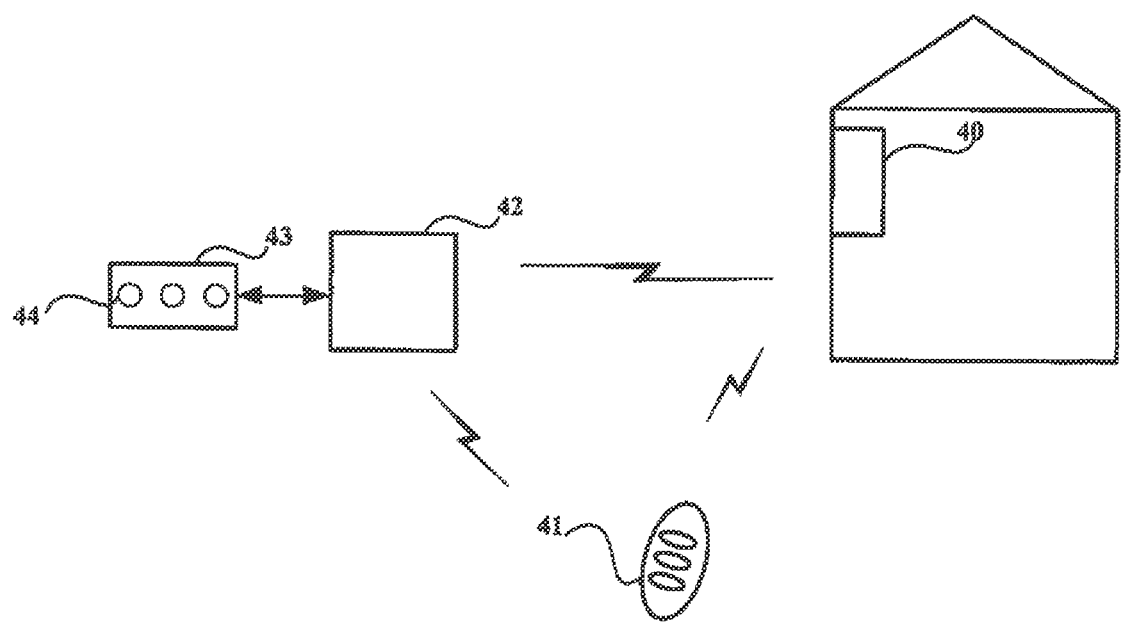
FIG. 1 illustrates a schematic diagram of the garage door opening system in the prior art.

Similarly to FIG. 1, the garage door opening system in FIG. 2 also includes a garage door receiver 40 located near the garage door and a handheld remote terminal 41 carried by the user. Unlike FIG. 1, the garage door opening system in FIG. 2 does not includes the garage door opener 42 provided by the provider to be installed within the vehicle. Instead, the function of the garage door opener 42 is implemented by the ECU 200. This is feasible since the ECU 200 such as a PEPS ECU inherently integrates the transceiver needed to realize the functions of a Universal Garage Door Opener (UGDO).

In a configuration step, the ECU 200 should learn the characteristics and credentials of the garage door signals through a learning procedure. The learning process will be entered by placing the ECU 200 in learning mode. This is done by the user activating the mode through an HMI located in the vehicle. While in learning mode, the user activates the handheld remote terminal 41 as to allow the ECU 200 listening to it, identifying its features and credentials and store them in a memory dedicated to that purpose.

Following a successful leaning procedure, the ECU 200 may communicate upon user request with the garage door receiver 40 and control the garage door for opening or closing. For example, the ECU 200 may transmit a signal to open or close the garage door in response to a user action such as a press on the button 44. The garage door receiver 40 positively authenticates the signals and credentials as if it would be sent by the handheld remote terminal 41.

The transceiver 100 may be a single-channel transceiver or a multi-channel transceiver. If the transceiver 100 is a single-channel transceiver, all systems must be working using the same carrier frequency (for example 43392 MHz). If the transceiver 100 is a multi-channel transceiver, the systems may be working in any sub-GHz frequency.

The signals received by the vehicle control system 10 according to the present disclosure may be from the RKE system, the TPMS system and/or the garage door opening system, and thus the ECU 200 should be able to distinguish the signals. To this end, signals from different system may be identified by at least one of a unique ID, a carrier frequency or frequency range, a modulation type and a communication protocol.

In one implementation, the signals from the RKE system, the TPMS system and the garage door opening system may be assigned with different unique IDs. In this case, the ECU 200 may determine which system the signal is received from based on the unique ID included in the received signal.

In another implementation, the signals from the RKE system, the TPMS system and the garage door opening system may be further assigned with different carrier frequencies or frequency ranges or frequency modulations or communication protocols in addition to the unique IDs. In this way, signals from the respective cars and receivers may not interfere.

In the solution of the present disclosure, all of the three functions are integrated into one hardware device and each of them works at a different phase of the whole utilization procedure of the vehicle. For example, the RKE function is only active while the vehicle is parked with its engine stopped, the TPMS function is only active while the vehicle engine is running, and the Remote Control function is triggered by user request. In this way, it avoids possible interferences that may be caused due to all functions operated at the same radio frequency.

Figure 3:
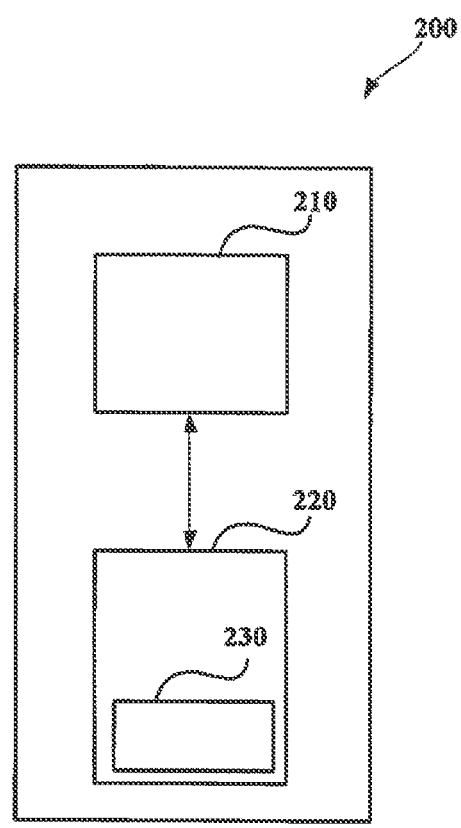
FIG. 3 illustrated a schematic diagram of the ECU of the vehicle control system according to the present disclosure.

FIG. 3 illustrated a schematic diagram of the ECU 200 of the vehicle control system 10 according to the present disclosure. As described above, the vehicle control system 10 may be embodied in the PEPS ECU of the vehicle.

As shown in FIG. 3, the ECU 200 includes a processor 210 that controls the operations and functions of the ECU 200. For example, in some implementations, the processor 210 may implement various operations by using the computer program codes or instructions 230 stored in the memory 220 coupled to the processor 210. The memory 220 may be of any type that is suitable for the implementation of the present disclosure and may be implemented by any suitable data storage technologies, including but not limited to semiconductor based storage devices, magnetic storage devices, or optical storage devices. Although only one memory 220 is illustrated in FIG. 3, a plurality of different memories 220 may be present in the engine control device 20.

The processor 210 may be of any type that is suitable for the implementation of the present disclosure, including but not limited to general purpose processor, dedicated processor, microprocessor, digital signal processor or any multi-core processor. Although only one processor 210 is illustrated in FIG. 5, a plurality of different processors 210 may be present in the ECU 200.

Those skilled in the art would further appreciate that the various illustrative logical blocks, units, and method steps described in connection with the embodiments of the present disclosure may be implemented as electronic hardware or computer software, or combinations of both. To clearly illustrate this interchangeability of hardware and software, various illustrative components, units, and method steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The above depiction of the present disclosure is to enable any of those skilled in the art to implement or use the present disclosure. For those skilled in the art, various modifications of the present disclosure are obvious, and the general principle defined herein may also be applied to other transformations without departing from the spirit and protection scope of the present disclosure. Thus, the present disclosure is not limited to the examples and designs as described herein, but should be consistent with the broadest scope of the principle and novel characteristics of the present disclosure.

What is claimed is:

1. A vehicle control system, comprising:
a single transceiver operating in a sub-GHz frequency band configured to transmit and receive
a first radio frequency (RF) signal comprising a first identifier and data for a Remote Keyless Entry (RKE) user terminal of the vehicle,
a second RF signal comprising a second identifier and data for a set of Tire Pressure Monitoring System (TPMS) sensors of the vehicle, and
a third RF signal comprising a third identifier and data for at least one remote control terminal outside the vehicle; and
an electric control unit (ECU) connected with the transceiver and configured to:
identify the first RF signal based on the first identifier to perform lock or unlock functions in response to data from the RKE user terminal,
identify the second RF signal based on the second identifier to receive tire pressure data from the TPMS sensors, and
identify the third RF signal based on the third identifier to control the remote control terminal in response to a user action.

2. The vehicle control system of claim 1, wherein the ECU is embedded in a Passive Entry Passive Start (PEPS) ECU.

3. The vehicle control system of claim 1, wherein the transceiver operates in a single frequency band.

4. The vehicle control system of claim 1, wherein the transceiver operates in multiple channels in different frequency bands.

5. The vehicle control system of claim 1, wherein the ECU is configured to authenticate the RKE user terminal so as to lock, unlock or start an engine of the vehicle in response to data from the RKE user terminal when the vehicle is in a parked state.

6. The vehicle control system of claim 1, wherein the ECU is configured to receive and assess tire pressure situations by using the tire pressure data from the TPMS sensors or to receive and directly broadcast the tire pressure data from the TPMS sensors when the vehicle engine is running.

7. The vehicle control system of claim 6, wherein the ECU is further configured to send commands to the TPMS sensors in responding to the tire pressure situations.

8. The vehicle control system of claim 1, wherein at least one remote control terminal is use to control at least one home appliance.

9. The vehicle control system of claim 1, wherein the ECU includes a Universal Garage Door Opener (UGDO).

10. The vehicle control system of claim 9, wherein the ECU is further capable of learning radio frequency signals transmitted from a handheld remote control terminal.

11. The vehicle control system of claim 10, wherein the ECU is further capable of replicating radio frequency signals when commanded to by a Human Machine Interface (HMI) located within the vehicle.

12. The vehicle control system of claim 1, wherein signals from the RKE user terminal, the TPMS sensors and the remote control terminal are identified by at least one of: a unique ID; a carrier frequency or frequency range; a modulation type; and a communication protocol.

13. The vehicle control system of claim 1, wherein the ECU includes a memory stored with software codes and a processor connected with the memory and configured to execute the software codes to perform the different functions.

* * * * *